United States Patent [19]

Evans et al.

[11] 4,456,427
[45] Jun. 26, 1984

[54] COOLING AIR INJECTOR FOR TURBINE BLADES

[75] Inventors: Dennis C. Evans, Topsfield; Robert A. Nicoll, Beverly; Robert E. Gladden, Burlington, all of Mass.

[73] Assignee: General Electric Company, Lynn, Mass.

[21] Appl. No.: 272,623

[22] Filed: Jun. 11, 1981

[51] Int. Cl.³ .............................................. F01D 5/18
[52] U.S. Cl. .................................. 416/95; 416/96 R; 416/92; 415/115
[58] Field of Search ........................ 416/92, 95, 96 R; 415/115

[56] References Cited

U.S. PATENT DOCUMENTS

| | | | |
|---|---|---|---|
| 2,988,325 | 6/1961 | Dawson | 416/95 |
| 3,791,758 | 2/1974 | Jenkinson | 416/95 |
| 4,178,129 | 12/1979 | Jenkinson | 416/95 |

FOREIGN PATENT DOCUMENTS 2054046  2/1981  United Kingdom ................ 415/115

Primary Examiner—Stephen Marcus
Assistant Examiner—John Kwon
Attorney, Agent, or Firm—Francis L. Conte; Derek P. Lawrence

[57] ABSTRACT

The turbine blades of a high pressure turbine in a gas turbine jet engine are cooled by cooling air injected into cooling channels in the blade using angled nozzles supplied with high pressure air from the engine compressor. The nozzles project the high pressure air across a lower-pressure gap into slots which lead to internal channels in the turbine disk without requiring the use of seals to produce a pressure differential to encourage the flow of cooling air. Maximum air transfer into the internal channels in the turbine blades occurs when the air impacting slots in the turbine wheel is travelling at an angle with respect to the slots which is approximately parallel to the axes of the internal channels. A relatively narrow range of angular misalignment for aiming the nozzles is permitted. The pressure of the air from the plenum may be reduced by employing two or more flow channels in series before projecting the air across the gap to the turbine wheel.

15 Claims, 10 Drawing Figures

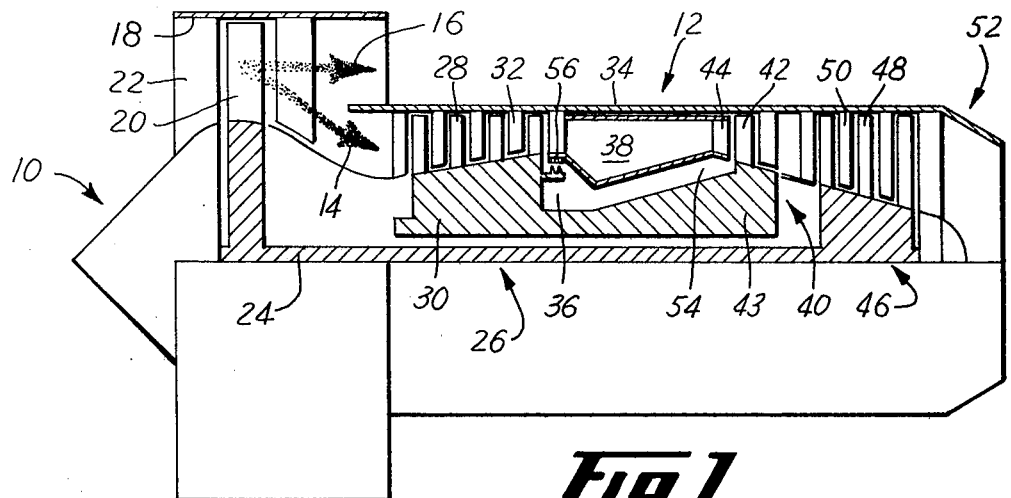
Fig 1
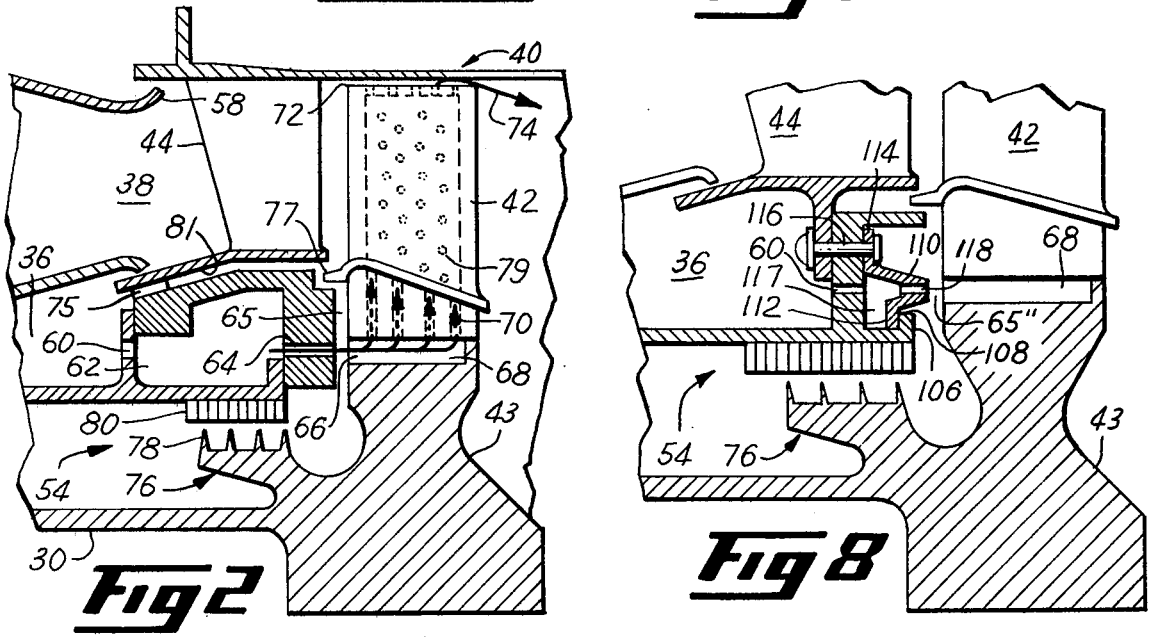
Fig 2
Fig 8
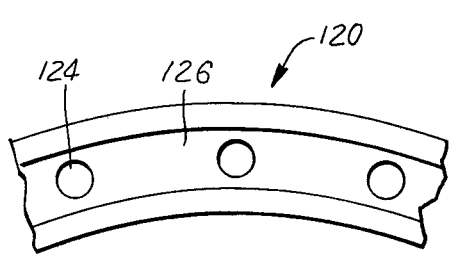
Fig 10
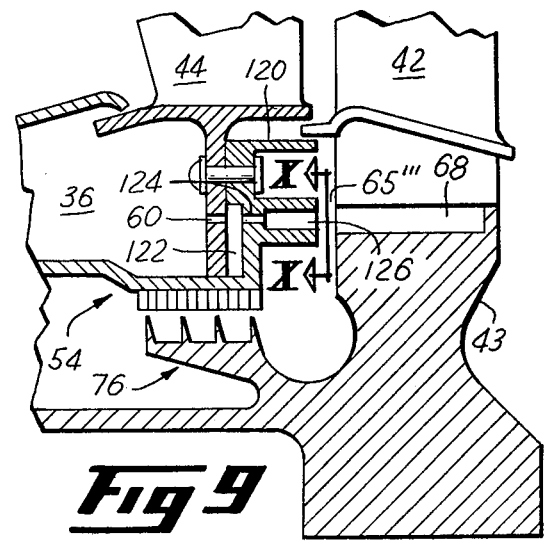
Fig 9

COOLING AIR INJECTOR FOR TURBINE BLADES

BACKGROUND OF THE INVENTION

Turbine blades of a core jet engine are exposed to temperatures beyond the ability of available materials to withstand without some means for cooling such blades. One method of cooling involves passing cooling air through passages in the interior of the turbine blades. Problems occur in transferring the air from the stationary pressure source to the rapidly rotating turbine blades. In the prior art, a system of labyrinth seals, typically consisting of three seals, has been used to provide the pressure gradient needed to move the air into the turbine blades. One typical way of accomplishing this sealing is disclosed in U.S. Pat. No. 3,989,410.

Such rotating seals operating in differential pressure environments produce axial forces on the rotating member. Careful balancing of seal effective areas has been required in order to counterbalance such axial forces.

Rotating seals are expensive components, subject to wear, and require substantial labor for installation. The elimination of one or more of such seals without destroying the ability to move cooling air on board the rotating turbine blades would be desirable.

OBJECTS AND SUMMARY OF THE INVENTION

It is, therefore, a general object of the present invention to provide an apparatus for supplying cooling air to turbine blades of a jet engine.

It is a further object of the invention to provide cooling air to turbine blades of a jet engine with a reduced necessity for rotating seals.

It is a further object of the invention to provide cooling air to turbine blades of a jet engine wherein the cooling air from a compressor is injected into slots in the rapidly rotating disk of a turbine wheel from a set of angled stationary nozzles. The stationary nozzles are angled to provide a predetermined arrival angle of the air with respect to the moving slots.

According to an aspect of the present invention, there is provided a gas turbine engine comprising a source of pressurized air, a combustion chamber wherein fuel is burned with the pressurized air to produce a rapid flow of hot gas, a turbine driven by the hot gas to actuate the source of pressurized air, the turbine including a rotatable disk having at least one row of turbine blades thereon, the rotatable disk and turbine blades being spaced from adjacent stationary portions of the engine by a gap, each of the turbine blades having a channel therein for the flow of cooling air, a circular row of spaced apart slots facing the gap connected to the channels in the turbine blades, a plurality of spaced apart nozzles in a circle on the stationary portions facing the slots, means for feeding the pressurized air to the nozzles, and the nozzles including means for forcing air into the slots at a first pressure substantially higher than a second pressure in the gap whereby the air is forced to flow through the channels for cooling the turbine blades.

According to a feature of the present invention, there is provided in a gas turbine engine of the type having a source of pressurized air, a combustion chamber wherein fuel is burned with the pressurized air to produce a rapid flow of hot gas, a turbine driven by the hot gas to actuate the source of pressurized air, the turbine including a rotatable disk having at least one row of turbine blades thereon, the rotatable disk and turbine blades being spaced from adjacent stationary portions of the engine by a gap, each of the turbine blades having a channel therein for the flow of cooling air, wherein the improvement comprises a circular row of spaced apart slots facing the gap, the slots being connected to the channels in the turbine blades, a plurality of spaced apart nozzles in a circle on the stationary portions facing the slots, means for feeding the pressurized air to the nozzles, and the nozzles including means for forcing air into the slots at a first pressure substantially higher than a second pressure in the gap whereby the air is forced to flow through the channels for cooling the turbine blades.

According to a further feature of the present invention, there is provided an air injector for use in a gas turbine engine of the type having a turbine driven by hot combustion gas and a compressor driven by the turbine to produce pressurized air in a plenum surrounding a combustion chamber in which fuel is burned with the pressurized air to produce the gas, the turbine including a rotatable disk having a plurality of turbine blades thereupon which the hot gas impinges to drive the turbine, each of the turbine blades having an internal channel for the passage of cooling gas therethrough, the rotatable disk and turbine blades being spaced from stationary portions of the engine by a gap, comprising a circular row of slots facing the gap, the slots providing fluid communication to the internal channels, a plurality of nozzles in a circle on the stationary portions facing the circular row of slots, whereby the slots are rotated past openings in the nozzles, an intermediate chamber, a plurality of channels from the plenum to the intermediate chamber for communicating the pressurized air to the intermediate chamber, the nozzles receiving pressurized air from the intermediate chamber and each being effective to project a stream of air toward the slots rotating there past on the disk, axes of the slots being angled with respect to an axis of the circular row of slots such that the stream of air from each of the nozzles impinges on the slots at a predetermined angle with respect to the disk, and the streams of air being effective to produce a first pressure in the slots exceeding a second pressure in the gap.

The above, and other objects, features and advantages of the present invention, will become apparent from the following description read in conjunction with the accompanying drawings, in which like reference numerals designate the same elements.

BRIEF DESCRIPTION OF THE DRAWINGS

FIG. 1 is a side view of a fan jet engine partially in cross section to reveal internal components.

FIG. 2 is an enlarged cross section of the vicinity of the high pressure turbine of the core engine of FIG. 1.

FIG. 8 is a cross sectional view similar to FIG. 2 showing a further embodiment of the invention.

FIG. 9 is a cross sectional view similar to FIG. 2 showing a still further embodiment of the invention.

FIG. 10 is a front view of a portion of the nozzle structure of FIG. 9 seen as in X—X of FIG. 9.

DETAILED DESCRIPTION OF THE PREFERRED EMBODIMENT

Figure 4:
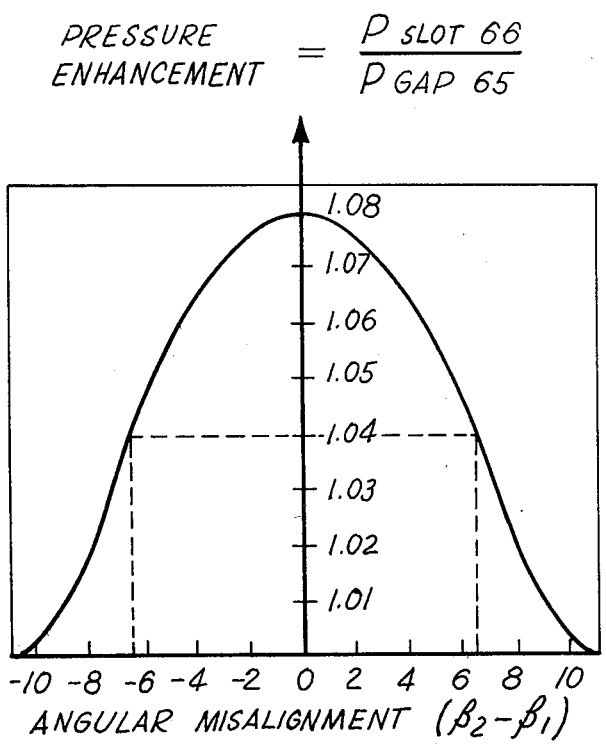
FIG. 4 is a graph to which reference will be made in describing pressure enhancement versus gas impingement angle.

Referring now to FIG. 1, there is shown, generally at 10, a jet or gas turbine engine employing a cooling air supply injector according to an embodiment of the present invention. Jet engine 10 contains a core engine shown generally at 12. Although the present invention is particularly related to core engine 12, core engine 12 is shown as part of a bypass engine, sometimes known as a fan-jet engine which, besides passing a stream of air 14 through core engine 12, also passes a bypass stream of air 16 between core engine 12 and an outer shroud 18 of jet engine 10. As is well known, the bypass stream of air 16 augments the thrust beyond that available from core engine 12 alone.

An inlet fan 20 is rotatable in an air inlet 22 on a shaft 24 to pressurize incoming air which is then divided into streams of air 14 and 16. Stream of air 14 passes into and is pressurized by a compressor 26 which includes a plurality of rows of rotating compressor blades 28 attached to a hollow shaft 30 through which shaft 24 passes in an independently rotatable manner. Interdigitated with compressor blades 28, a plurality of rows of stationary blades 32 are stationarily mounted to a shroud 34 of core engine 12.

The air compressed by compressor 26 passes into a plenum 36 surrounding a combustion chamber 38. As is well known, the pressurized air from plenum 36 passes into combustion chamber 38 through a number of passages (not shown in FIG. 1) where it is mixed and burned with fuel to provide an energetic flow of hot pressurized gas which is directed to a high-pressure turbine 40. The hot gas rapidly flowing from combustion chamber 38 acts on a turbine wheel consisting of a plurality of turbine blades 42 affixed to a rotating disk 43 on hollow shaft 30 to rotate hollow shaft 30 at high speed and to thereby extract a portion of the energy in the hot gas outflowing from combustion chamber 38 to turn compressor 26 at a high rate. One or more rows of stationary blades 44 are conventionally included attached to shroud 34.

A low-pressure turbine 46, including a plurality of rows of rotatable turbine blades 48 affixed to the aft end of shaft 24 interdigitated with a plurality of stationary turbine blades 50, provides the motive power for driving inlet fan 20. The hot gas outflow from low-pressure turbine 46 is passed to an exhaust region 52 where it produces thrust.

The hot gas from combustion chamber 38 impinging on the blades of high-pressure turbine 40 tends to overheat these blades and, in particular, tends to overheat the turbine blades 42 since these blades have a limited capacity for discharging heat. It is, therefore, customary to provide means for transferring compressed air from plenum 36 into channels in turbine blades 42 for cooling thereof. In order to provide a pressure gradient which permits air to be forced from plenum 36 into channels in turbine blades 42, a plurality of seals (not shown) is normally required in the vicinity of the location identified generally by reference designator 54 to seal against plenum air simply escaping through the gap between the stationary elements and the rotating elements of high-pressure turbine 40. Such seals may be labyrinth-type seals which, besides being expensive, require a substantial amount of labor to properly install. In addition to seals in location 54, an additional rotating seal may also conventionally be required in a location indicated by reference designator 56 to seal pressurized air at the inlet to plenum 36.

It would be clear to one skilled in the art that, without seals in location 54, the pressures in combustion chamber 38, location 54 and high-pressure turbine 40 would be substantially equal. Thus, a pressure differential sufficient to move cooling air into chambers in turbine blades 42 could not exist.

The rotating seals in locations 54 and/or 56 are conventionally included as part of an axial balancing system wherein the tendency of high-pressure turbine 40 and compressor 26 to move axially due to unbalanced forces thereon is counteracted by the pressure acting over the effective areas of such seals and tending to urge these parts in an axial direction.

The applicants have discovered that it is possible to design a core engine 12 which is axially balanced without any balancing contribution from different effective areas of seals in locations 54 and/or 56. Thus, the expense of one or more seals in these locations could be eliminated if it were possible to transfer cooling air from stationary plenum 36 to rotating turbine blades 42 without assistance from such seals.

Referring now to FIG. 2, the hot energetic gas from combustion chamber 38 passes through an exit nozzle 58 into high-pressure turbine 40 where it is guided by stationary blades 44 into impingement upon the row of rotating turbine blades 42. Cooling air from plenum 36 is admitted through a plurality of channels or passages 60 into an annular intermediate chamber 62. A circular array of spaced-apart air injector nozzles 64 (only one of which is shown) is directed across a gap 65 toward a circular row of slots 66 in rotating disk adjacent the bases of turbine blades 42. Slots 66 each open into an internal channel 68 which, in turn, permits cooling air to flow upward through one or more cooling channels 70 toward a tip 72 of turbine blades 42. Tip 72 is open so that cooling air may escape therefrom as indicated by an arrow 74. A plurality of transverse pins 79 provides improved heat transfer from turbine blades 42 to the cooling air flowing through cooling channels 70.

A labyrinth-type seal 76, consisting of an annular comb-like structure 78 contacts an annular rub strip 80 to control the amount of pressurized gas or air escaping therepast from gap 65.

As would be clear to one skilled in the art, the pressure in gap 65 is approximately equal to the pressure from exit nozzle 58 after it passes stationary blades 44. However, the inventors have discovered that, by properly arranging air injector nozzles 64 with respect to slots 66, cooling air from air injector nozzles 64 can be injected across gap 65 into internal channels 68 and thus through cooling channels 70 to cool turbine blades 42.

It would be clear to one skilled in the art that requiring the cooling air to pass through passage 60 and intermediate chamber 62 before exiting, air injector nozzles 64 adds some resistance to the air flow. In certain circumstances, this may be advantageous to permit the use of larger air injector nozzles 64 than would otherwise be possible. Under some circumstances, such resistance is necessary since the size of air injector nozzles 64 may otherwise be too small for practical production purposes. In the proper case, passage 60 and intermediate chamber 62 may be omitted. If these are omitted, other measures, explained hereinafter, may or may not be employed to permit increasing the size of air injector nozzles 64.

A channel 75 may be provided bypassing intermediate chamber 62 for directing a flow of cooling air from plenum 36 along the inner surface 81 of the flow channel containing stationary blades 44.

A flow discourager 77 also known as angel wings may be provided to discourage the flow of hot gas from stationary blades 44 into gap 65.

Figure 3:
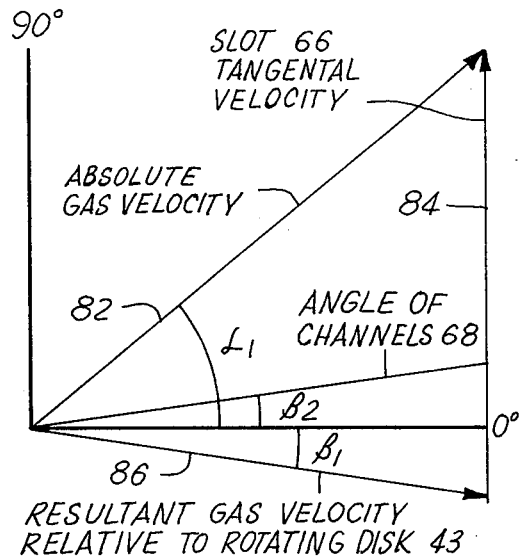
FIG. 3 is a vector diagram to which reference will be made in explaining the angular relationships of gas velocity and slot tangential velocity.

The angle at which air impacts on slots 66 is critical in achieving satisfactory transfer of cooling air into turbine blades 42. For best performance, the air should reach slots 66 with a velocity vector which is parallel to the axes of internal channels 68 as they rotate with rotating disk 43. The vector diagram of FIG. 3 identifies the terms which will enable understanding of the angular and velocity relationships. An absolute gas vector 82 indicates by its length and its angular direction $\alpha_1$ the absolute speed and direction respectively of gas passing from air injector nozzles 64 toward slots 66. The zero axis in FIG. 3 is parallel to the axis of rotating disk 43. A vector 84 indicates by its length and direction the tangential velocity of rotating disk 43 as it passes air injector nozzles 64. The direction of vector 84 is, of course, normal to the rotor axis. A resultant gas velocity vector relative to a line from rotating disk 43 at slots 66 parallel to the rotor axis is shown at 86. The angle $\beta_1$ of resultant gas velocity vector 86 takes into account the tangential velocity vector 84 of rotating disk 43 and the absolute gas velocity vector 84. The angle $\beta_2$ describes the angle made by the axes of internal channels 68 with respect to the rotor axis. If angle $\beta_1$ of resultant gas velocity vector 86 is parallel to angle $\beta_2$ of internal channels 68, maximum pressure enhancement in internal channels 68 will be obtained.

In the situation shown in FIG. 3, resultant gas velocity vector 86 is misaligned with the angle of channels 68 and thus is less than optimally efficient. It would be clear to one skilled in the art that the misalignment between angles $\beta_2$ and $\beta_1$ could be reduced by increasing the magnitude of absolute gas velocity vector 82, increasing the angle $\alpha$ of nozzles 64, reducing the speed of rotating disk 43 and thus reducing the length of vector 84 or changing angle $\beta_2$ of the axes of internal channels 68.

Referring now to FIG. 4, there is shown pressure enhancement defined as the ratio of pressure in slots 66 to the pressure in gap 65 (FIG. 2) versus the angular misalignment between angle $\beta_1$ of resultant gas velocity vector 86 and angle $\beta_2$ of the axes of internal channels 68 ($\beta_2-\beta_1$). When the angular misalignment was zero ($\beta_2-\beta_1=0$) in one embodiment, the pressure ratio reaches a peak of 1.08. That is, a pressure increase of 8% is experienced in slots 66, internal channels 68 and cooling channels 70 in turbine blades 42 as compared to the pressure in gap 65 which, it will be recalled, is approximately equal to the gas pressure leaving stationary blades 44. Thus, a positive cooling air flow through cooling channels 70 is attainable. As shown in FIG. 4, as the angular misalignment increases from zero to some maximum angle, represented here by maximum angles of $\pm 10°$, the pressure enhancement in slots 66 decreases from 8% to zero. For adequate cooling in one embodiment, a pressure enhancement of about 4% was required. This established the limits of angular misalignment between about $\pm 6.5°$. The exact numbers expressed for pressure enhancement and angular misalignment in the preceding discussion are illustrative only and should not be taken as limiting the invention. In other embodiments, the range of angular misalignment over which any pressure enhancement is achieved may be greater or less than $\pm 10°$ and the angular range for satisfactory performance may differ from $\pm 6.5$. For one embodiment, peak pressure enhancement was attained with direction $\alpha_1$ of air injector nozzles 64 at 19 degrees with respect to lines parallel to the axis of rotating disk 43.

It may be noted that resultant gas velocity angle $\beta_1$ is relatively independent of excursions in turbine speed if the air exiting air injector nozzles 64 travels at approximately Mach 1. This comes about since the absolute gas velocity vector 82 and slot tangential velocity vector 84 (FIG. 3) are both inversely proportional to the square root of turbine inlet temperature which is, in turn, related to turbine speed. Thus, a fixed angle $\beta_1$ of air injector nozzles 64 with respect to the axis of high-pressure turbine 40 is satisfactory over a wide operating range.

Figure 5:
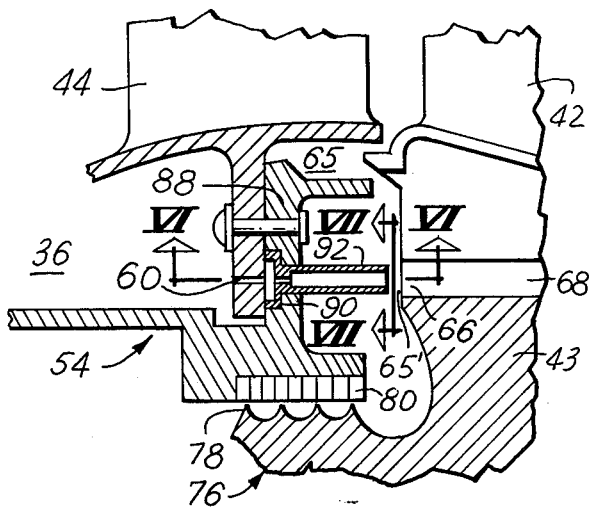
FIG. 5 is a view similar to FIG. 2 of another embodiment of the invention in which the gap across which cooling air must be projected is reduced.

Returning momentarily to FIG. 2, the applicants have discovered that the width of gap 65 between air injector nozzles 64 and slots 66 should be as small as possible for maximum pressure enhancement. Referring now to FIG. 5, there is shown an apparatus for reducing such width. A radial flange 88 having a series of counterbored holes 90 therein secures a plurality of nozzles 92 (one of which is shown) which extend forward of radial flange 88 toward slots 66 and thereby reduce the width of gap 65'.

Figure 6:
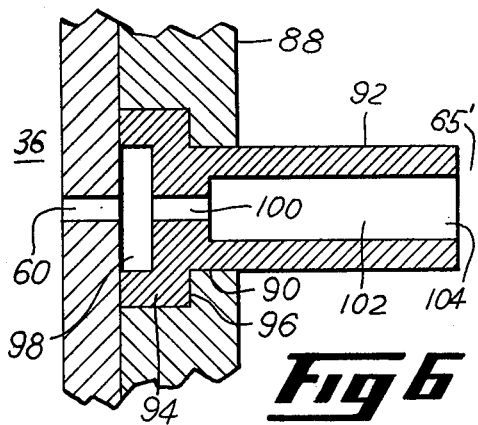
FIG. 6 is a cross section taken along VI—VI of FIG. 5.

Referring now to FIG. 6, nozzles 92 are shown in greater detail. Nozzle 92 includes a head 94 forming a protuberance which is captivated in a counterbore portion 96 of counterbored holes 90. A hollow portion 98 of head 94 has a diameter which is substantially greater than the diameter of passage 60 feeding air thereto from plenum 36. A relatively narrow flow restrictor channel 100 leads axially from hollow portion 98 into an axial chamber 102. The size and lengths of passage 60, hollow portion 98, flow restrictor channel 100 and axial channel 102 can be adjusted to provide the proper flow rate and air velocity at the ring 104 of nozzles 92. In this embodiment, hollow portion 98 performs the same function as was performed by intermediate chamber 62 in the embodiment of FIG. 2. Although the axes of passage 60 and flow restrictor channel 100 are shown aligned, increased resistance to flow can be achieved by placing these elements in a misaligned relationship so that the air flowing from plenum 36 must turn corners before reaching flow restrictor channel 100.

Figure 7:
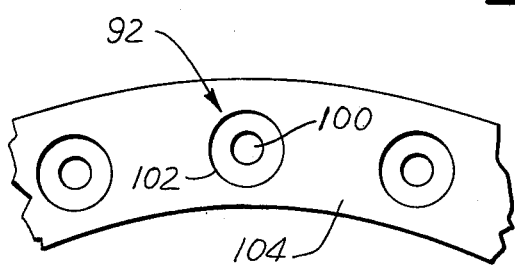
FIG. 7 is a front view of a portion of the nozzle structure in FIG. 5 viewed as from VII—VII of FIG. 5.

Nozzles 92 may optionally be either a set of discrete generally cylindrical nozzles or may be part of an annular ring having appropriate bores therein. This latter alternative is illustrated in FIG. 7, wherein nozzles 92 are tangentially spaced apart in a ring 104.

Referring now to FIG. 8, a further embodiment of the invention is shown in which a partial flange 106 produces an abutment step 108. A dome-shaped annular structure 110 has a first annular flange 112 which rests behind, and is captured by abutment step 108. A second flange 114 is secured by any convenient means, such as, for example, a series of rivets 116.

An internal cavity 117 in dome-shaped annular structure 110 receives air from passage 60 and delivers air to flow nozzle 118 which thereupon directs cooling air flow across gap 65″ into internal channels 68. As in previous embodiments, the relative sizes and positions of passage 60, cavity 117 and nozzles 118 are selected for satisfactory pressure enhancement in internal channels 68.

Referring now to FIG. 9, a further embodiment of the invention is shown in which a radial flange 120 includes a cavity 122 receiving cooling air from plenum 36 via passage 60 and a plurality of nozzle bores 124. In order to adjust the flow distribution of cooling air across gap 65‴, an annular channel 126 is provided in the face of radial flange 120.

An end view of radial flange 120 is shown in FIG. 10 wherein nozzle bores 124 are shown tangentially spaced apart in the bottom of annular channel 126.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gas turbine engine comprising:
   a source of pressurized air;
   a combustion chamber wherein fuel is burned with said pressurized air to produce a rapid flow of hot gas;
   a plenum surrounding said combustion chamber effective for receiving said pressurized air;
   a turbine driven by said hot gas to actuate said source of pressurized air;
   said turbine including a rotatable disk having at least one row of turbine blades thereon;
   said rotatable disk and turbine blades being spaced from adjacent stationary portions of said engine by a gap;
   each of said turbine blades having a channel therein for the flow of cooling air, said channel being disposed at an angle relative to a longitudinal axis of said engine;
   a circular row of spaced apart slots in said disk facing said gap connected to said channels in said turbine blades;
   a plurality of spaced apart nozzles in a circle on said stationary portions facing said slots;
   an annular stationary intermediate chamber disposed between said plenum and said nozzles;
   a plurality of passages disposed in walls defining said intermediate chamber for communicating said pressurized air from said plenum to said intermediate chamber;
   said nozzles being in flow communication with said intermediate chamber for receiving pressurized air therefrom and each being effective to project a stream of air at a predetermined angle from said nozzles and across said gap toward said slots in said disk; and
   said passages and said intermediate chamber being sized relative to said nozzles for adding resistance to flow of said pressurized air flowable therebetween for reducing velocity and controlling flow rate thereof, so that angular misalignment represented by the difference between said predetermined angle and said angle of said channel is substantially zero in magnitude for obtaining a pressure enhancement in said slots with respect to said gap of a magnitude greater than 1.0.

2. A gas turbine engine according to claim 1, wherein said angular misalignment is between about −10 and about +10 degrees.

3. A gas turbine engine according to claim 1, wherein each of said nozzles is a discrete tube extending part way across said gap toward said slots.

4. A gas turbine engine according to claim 1, wherein said nozzles include bored holes in a plate.

5. A gas turbine engine according to claim 4 further including an annular channel in a surface of said plate facing said slots, said nozzles being located in said annular channel.

6. A gas turbine engine according to claim 1, wherein said nozzles are disposed in an annular structure.

7. A gas turbine engine according to claim 6, wherein said annular structure has a generally dome-shaped cross section.

8. In a gas turbine engine of the type having a source of pressurized air, a combustion chamber wherein fuel is burned with said pressurized air to produce a rapid flow of hot gas, a plenum surrounding said combustion chamber effective for receiving said pressurized air, a turbine driven by said hot gas to actuate said source of pressurized air, said turbine including a rotatable disk having at least one row of turbine blades thereon, said rotatable disk and turbine blades being spaced from adjacent stationary portions of said engine by a gap, each of said turbine blades having a channel therein for the flow of cooling air, said channel being disposed at an angle relative to a longitudinal axis of said engine, said disk including a circular row of spaced slots therein facing said gap and connected to said channels in said turbine blades, wherein the improvement comprises:
   a plurality of spaced apart nozzles in a circle on said stationary portions facing said slots;
   an annular stationary intermediate chamber disposed between said plenum and said nozzles;
   a plurality of passages disposed in walls defining said intermediate chamber for communicating said pressurized air from said plenum to said intermediate chamber;
   said nozzles being in flow communication with said intermediate chamber for receiving pressurized air therefrom and each being effective to project a stream of air at a predetermined angle from said nozzles and across said gap toward said slots in said disk; and
   said passages and said intermediate chamber being sized relative to said nozzles for adding resistance to flow of said pressurized air flowable therebetween for reducing velocity and controlling flow rate thereof, so that angular misalignment represented by the difference between said predetermined angle and said angle of said channel is substantially zero in magnitude for obtaining a pressure enhancement in said slots with respect to said gap of a magnitude greater than 1.0.

9. Apparatus according to claim 8, wherein said angular misalignment is between about −10 and about +10 degrees.

10. Apparatus according to claim 8, wherein each of said nozzles is a discrete tube extending part way across said gap toward said slots.

11. Apparatus according to claim 8, wherein said nozzles include bored holes in a plate.

12. Apparatus according to claim 11 further including an annular channel in a surface of said plate facing said slots, said nozzles being located in said annular channel.

13. Apparatus according to claim 8, wherein said nozzles are disposed in an annular structure.

14. Apparatus according to claim 13, wherein said annular structure has a generally dome-shaped cross section.

15. An air injector for use in a gas turbine engine of the type having a turbine driven by hot combustion gas and a compressor driven by said turbine to produce pressurized air in a plenum surrounding a combustion chamber in which fuel is burned with said pressurized air to produce said gas, said turbine including a rotatable disk having a plurality of turbine blades thereon upon which said hot gas impinges to drive said turbine, each of said turbine blades having an internal channel for the passage of cooling gas therethrough, said channel being disposed at an angle relative to a longitudinal axis of said engine, said rotatable disk and turbine blades being spaced from stationary portions of said engine by a gap, said disk including a circular row of spaced slots therein facing said gap for providing fluid communication to said internal channels, comprising:

a plurality of nozzles in a circle on said stationary portions facing said circular row of slots, whereby said slots are rotatable past openings in said nozzles;

an annular stationary intermediate chamber disposed between said plenum and said nozzles;

a plurality of passages disposed in walls defining said intermediate chamber for communicating said pressurized air from said plenum to said intermediate chamber;

said nozzles being in flow communication with said intermediate channel for receiving pressurized air therefrom and each being effective to project a stream of air at a predetermined angle from said nozzles and across said gap toward said slots in said disk; and said passages and said intermediate chamber being sized relative to said nozzles for adding resistance to flow of said pressurized air flowable therebetween for reducing velocity and controlling flow rate thereof, so that angular misalignment represented by the difference between said predetermined angle and said angle of said channel is substantially zero in magnitude for obtaining a pressure enhancement in said slots with respect to said gap of a magnitude greater than 0.1.

* * * * *